US012803419B2

(12) United States Patent
Pahkala et al.

(10) Patent No.: US 12,803,419 B2
(45) Date of Patent: Nov. 17, 2026

(54) SWITCHING CONVERTER CONTROLLER WITH VALLEY CURRENT MODE CONTROL AND ADJUSTABLE PEAK THRESHOLD TRANSITIONS

(71) Applicant: TEXAS INSTRUMENTS INCORPORATED, Dallas, TX (US)

(72) Inventors: Janne Pahkala, Oulu (FI); Ari Vaananen, Oulu (FI)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 244 days.

(21) Appl. No.: 18/359,387

(22) Filed: Jul. 26, 2023

(65) Prior Publication Data

US 2025/0038644 A1 Jan. 30, 2025

(51) Int. Cl.

| | |
|---|---|
| ***H02M 1/088*** | (2006.01) |
| ***H02M 1/00*** | (2006.01) |
| ***H02M 1/14*** | (2006.01) |
| ***H02M 3/158*** | (2006.01) |

(52) U.S. Cl.
CPC ......... *H02M 1/088* (2013.01); *H02M 1/0009* (2021.05); *H02M 1/0032* (2021.05); *H02M 1/14* (2013.01); *H02M 3/158* (2013.01)

(58) Field of Classification Search
CPC ..... H02M 1/0032; H02M 3/158; H02M 3/156
See application file for complete search history.

(56) References Cited

U.S. PATENT DOCUMENTS

| | | | | |
|---|---|---|---|---|
| 10,784,783 | B1 * | 9/2020 | Harshey | H02M 3/1588 |
| 2021/0083583 | A1 * | 3/2021 | Becker | H03K 5/24 |

* cited by examiner

*Primary Examiner* — Alex Torres-Rivera
(74) *Attorney, Agent, or Firm* — Charles F. Koch

(57) ABSTRACT

A circuit includes a controller. The controller includes: a first control circuit; a second control circuit; a detection circuit; mode control logic; and driver circuitry. A first input of the mode control logic is coupled to an output of the first control circuit. A second input of the mode control logic coupled to an output of the second control circuit. A third input of the mode control logic is coupled to an output of the detection circuit. A first input of the driver circuitry is coupled to a first output of the mode control logic. A second input of the driver circuitry is coupled to a second output of the mode control logic.

14 Claims, 8 Drawing Sheets

SWITCHING CONVERTER CONTROLLER WITH VALLEY CURRENT MODE CONTROL AND ADJUSTABLE PEAK THRESHOLD TRANSITIONS

BACKGROUND

Switching converters are used to provide a direct-current (DC) output voltage (VOUT) based on a DC input voltage (VIN). A typical switching converter includes: a power stage with switches and an inductor; and a controller for the switches of the power stage. Switching converter efficiency varies depending on proper management of switching control responsive to variations in VIN, VOUT, load, operating frequency, and inductor. Mode transitions of the controller in response to load changes (e.g., light load to heavy load, or heavy load to light load) are problematic, often causing inefficient operation and/or VOUT ripple.

SUMMARY

In an example, a circuit includes a controller. The controller includes: a first control circuit having a first input, a second input, and an output; a second control circuit having a first input, a second input, and an output; a detection circuit having a first input, a second input, and an output; mode control logic having a first input, a second input, a third input, a first output, and a second output; and driver circuitry having a first input, a second input, a first output, and a second output. The first input of the mode control logic is coupled to the output of the first control circuit. The second input of the mode control logic is coupled to the output of the second control circuit. The third input of the mode control logic is coupled to the output of the detection circuit. The first input of the driver circuitry is coupled to the first output of the mode control logic. The second input of the driver circuitry is coupled to the second output of the mode control logic.

In another example, a switching converter controller for a power stage is configured to: operate in a pulse-width modulation (PWM) mode; detect a light load condition; adjust an offset between a valley threshold and a peak threshold responsive to the detected light load condition; and transition to a pulse-frequency modulation (PFM) mode responsive to a comparison indicating an inductor current of the power stage reaches the peak threshold.

In yet another example, a method includes: operating, by a controller, in a PWM mode; detecting, by the controller, a light load condition; adjusting, by the controller, an offset between a valley threshold and a peak threshold responsive to the detected light load condition; and transitioning, by the controller, to a PFM mode responsive to a comparison result indicating an inductor current of the power stage reaches the peak threshold.

DETAILED DESCRIPTION

Figure 1:
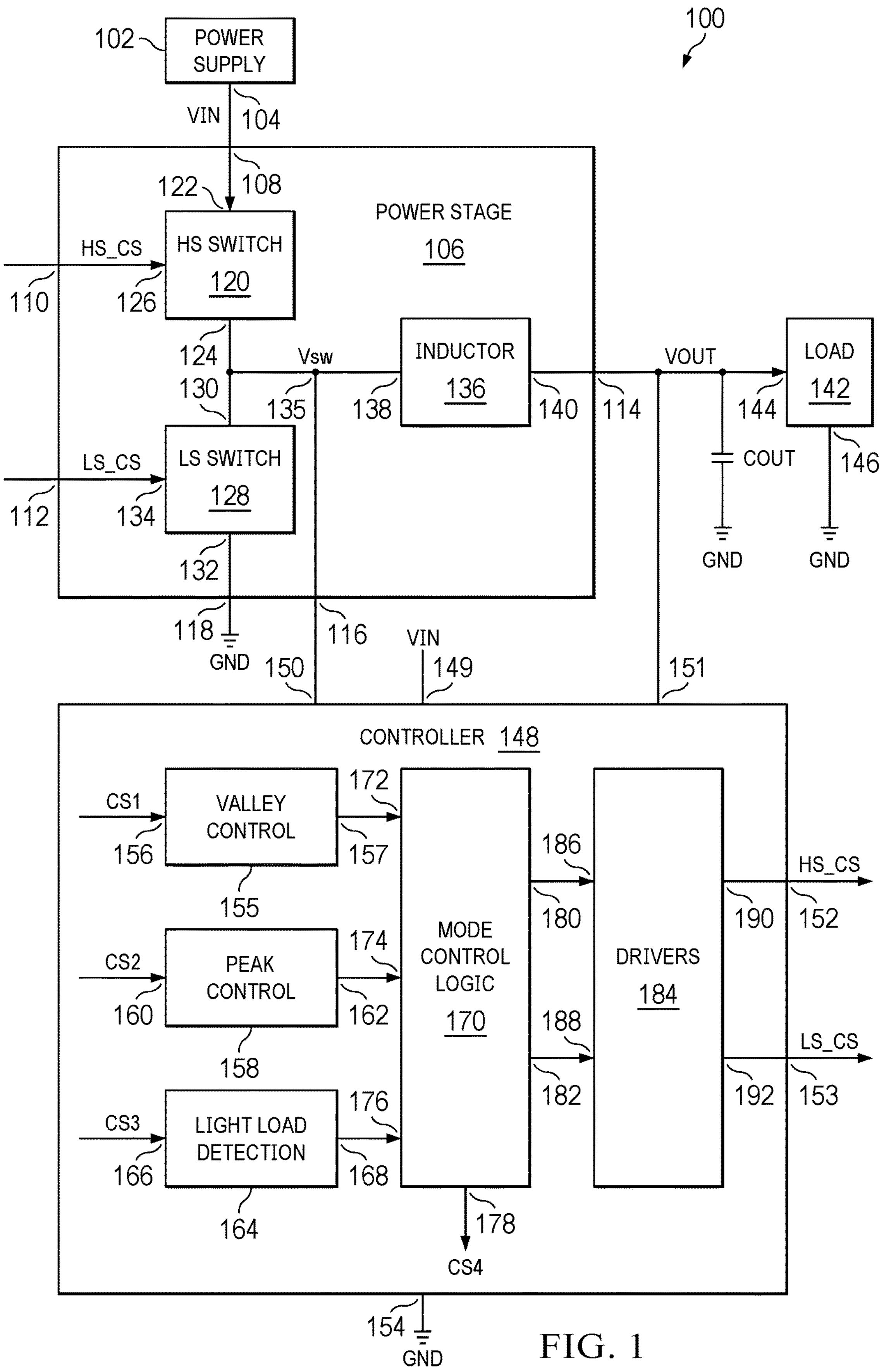
FIG. 1 is a diagram showing an example system.

The same reference numbers or other reference designators are used in the drawings to designate the same or similar features. Such features may be the same or similar either by function and/or structure.

FIG. 1 is a diagram showing an example system 100. The system 100 includes a power supply 102, a power stage 106, an output capacitor (COUT), a load 142, and a controller 148. The power supply 102 has a terminal 104. The power stage 106 has a first terminal 108, a second terminal 110, a third terminal 112, a fourth terminal 114, a fifth terminal 116, and a ground terminal 118. COUT has a first terminal and a second terminal. The load 142 has a terminal 144 and a ground terminal 146. The controller 148 has a first terminal 149, a second terminal 150, a third terminal 151, a fourth terminal 152, a fifth terminal 153, and a ground terminal 154.

As shown, the power stage 106 includes a high-side (HS) switch 120, a low-side (LS) switch 128, and an inductor 136 in the arrangement shown. In some examples, the HS switch 120, LS switch 128, and related drivers are components of an integrated circuit (IC), and the inductor 136 is an external component relative to the IC. The arrangement of components for the power stage 106 of FIG. 1 is referred to as a buck converter topology, where the output voltage (VOUT) is lower than the input voltage (VIN). In other examples, the topology of the power stage 106 may vary. In the example of FIG. 1, the HS switch 120 has a first terminal 122, a second terminal 124, and a control terminal 126. The LS switch 128 has a first terminal 130, a second terminal 132, and a control terminal 134. In some examples, the HS switch 120 and the LS switch 128 are p-channel field-effect transistors ("PFETs"). The inductor 136 has a first terminal 138 and a second terminal 140. The controller 148 includes valley control circuitry 155, peak control circuitry 158, a light load detection circuitry 164, mode control logic 170, and driver circuitry 184. The valley control circuitry 155 has input(s) 156 and an output 157. The peak control circuitry 158 has input(s) 160 and an output 162. The light load detection circuitry 164 has input(s) 166 and an output 168. The mode control logic 170 has a first terminal 172, a second terminal 174, a third terminal 176, a fourth terminal 178, a fifth terminal 180, and a sixth terminal 182. The driver circuit 184 has a first terminal 186, a second terminal 188, a third terminal 190, and a fourth terminal 192.

The first terminal 108 of the power stage 106 is coupled to the terminal 104 of the power supply 102 and receives VIN. The first terminal 149 of the controller 148 is also coupled to the terminal 104 of the power supply 102 and/or the first terminal 108 of the power stage 106. The second terminal 110 of the power stage 106 is coupled to the fourth terminal 152 of the controller 148 and receives a HS switch control signal (HS_CS). The third terminal 112 of the power stage 106 is coupled to the fifth terminal 153 of the controller 148 and receives a LS switch control signal (LS_CS). The fourth terminal 114 of the power stage 106 is coupled to the terminal 144 of the load 142 and provides VOUT. The first terminal of COUT is also coupled to the fourth terminal 114 of the power stage 106 and the terminal 144 of the load 142. The second terminal of COUT is coupled to a ground terminal. The fifth terminal 116 of the power stage 106 is coupled to the second terminal 150 of the controller 148 and provides a switch node voltage ($V_{SW}$). The ground terminal 118 of the power stage 106, the ground terminal 154 of the controller 148, and the ground terminal 146 of the load 142 are coupled to ground.

As shown, the first terminal 122 of the HS switch 120 is coupled to the first terminal 108 of the power stage 106. The second terminal 124 of the HS switch 120 is coupled to the first terminal 130 of the LS switch 128 and to the first terminal 138 of the inductor 136. The control terminal 126 of the HS switch 120 is coupled to the second terminal 110 of the power stage 106. The second terminal 132 of the LS switch 128 is coupled to the ground terminal 118 of the power stage 106. The control terminal 134 of the LS switch 128 is coupled to the third terminal 112 of the power stage 106. As shown, the fifth terminal 116 of the power stage 106 is coupled second terminal 124 of the HS switch 120, the first terminal 130 of the LS switch 128, and the first terminal 138 of the inductor 136. The second terminal 140 of the inductor 136 is coupled to the fourth terminal 114 of the power stage 106. In the example of FIG. 1, the second terminal 124 of the HS switch 120, the first terminal 130 of the LS switch 128, and the first terminal 138 of the inductor 136 are coupled to a switch node 135 between the HS switch 120 and the LS switch 128.

As shown, the input(s) 156 of the valley control circuitry 155 receive control signal(s) CS1. In some examples, CS1 includes a valley threshold and an inductor current sense signal. In some examples, the valley threshold and/or the inductor current sense signal are ramped. The input(s) 160 of the peak control circuitry 158 receive control signal(s) CS2. In some examples, CS2 includes a peak threshold and an inductor current sense signal. The input(s) 166 of the light load detection circuitry 164 receive control signal(s) CS3. In some examples, CS3 includes a control voltage (e.g., V_CTRL herein) and a light load threshold (e.g., ZER-O_REF herein). In some examples, the control voltage controls the output current of the power stage 106 and indicates the output current level. Accordingly, one option to detect a light load condition involves monitoring the control voltage relative to a threshold.

The first terminal 172 of the mode control logic 170 is coupled to the output 157 of the valley control circuitry 155. The second terminal 174 of the mode control logic 170 is coupled to the output 162 of the peak control circuitry 158. The third terminal 176 of the mode control logic 170 is coupled to the output 168 of the light load detection circuitry 164. The fifth terminal 180 of the mode control logic 170 is coupled to the first terminal 186 of the driver circuitry 184. The sixth terminal 182 of the mode control logic 170 is coupled to the second terminal 188 of the driver circuitry 184. The third terminal 190 of the driver circuitry 184 is coupled to the fourth terminal 152 of the controller 148. The fourth terminal 192 of the driver circuitry 184 is coupled to the fifth terminal 153 of the controller 148.

In operation, the controller 148 is configured to: receive VIN at its first terminal 149; receive $V_{SW}$ at its second terminal 150; receive VOUT at its third terminal 151; provide HS_CS at its fourth terminal 152 responsive to VIN, $V_{SW}$, VOUT, and the operations of the valley control circuitry 155, the peak control circuitry 158, the light load detection circuitry 164, the mode control logic 170, and the driver circuitry 184; and provide LS_CS at its fifth terminal 153 responsive to VIN, $V_{SW}$, VOUT, and the operations of the valley control circuitry 155, the peak control circuitry 158, the light load detection circuitry 164, the mode control logic 170, and the driver circuitry 184. In some examples, the controller 148 is configured to: sense inductor current of the power stage responsive to VIN, $V_{SW}$ and GND; adjust an offset between a valley threshold and a peak threshold responsive to a light load condition detected by the light load detection circuitry 164; and transition from a first mode to a second mode responsive to the light load condition and a comparison indicating the sensed inductor current reaches the peak threshold. The comparison is performed, for example, by the peak control circuitry 158. In some examples, the first mode is a pulse-width modulation (PWM) mode, and the second mode is a pulse-frequency modulation (PFM) mode.

In operation, the power stage 106 is configured to: receive VIN at its first terminal 108; receive HS_CS at its second terminal 110; receive LS_CS at its third terminal 112; provide VOUT at its fourth terminal 114 responsive to VIN, HS_CS, and LS_CS; provide $V_{SW}$ at its fifth terminal 116 responsive to VIN, HS_CS, and LS_CS; and provide a coupling between the ground terminal 118 and ground. More specifically, the HS switch 120 couples VIN to the switch node 135 responsive to HS_CS, which increases the current in the inductor 136. The LS switch 128 couples the ground terminal 118 to the switch node 135 responsive to LS_CS, which decreases the current in the inductor 136. The average current in the inductor 136 is considered the load current provided to the load 142.

Example modes supported by the controller 148 include PWM mode and a PFM mode. In some examples, the PFM pulse size is selected to achieve good efficiency and to avoid high VOUT ripple or mode bouncing between the PFM and PWM modes. In some examples, the controller 148 is configured to optimize efficiency by entering the PFM mode at light loads (e.g., when the inductor current goes below zero current in the PWM mode). In a light load scenario, the maximum PFM output current is selected to be larger than the load current to avoid mode bounce and VOUT overshoots or undershoots. In other words, the PFM pulse is selected to be larger than the current ripple in the PWM mode. Example conditions that may cause variance in the inductor current ripple in the PWM mode include variances in VIN, VOUT, operating frequency, and inductance of the inductor 136. In some examples, the inductance of the inductor 136 may vary up to +/−30%. Also, an example operating frequency may vary up to +/−20%. Also, an example VIN may vary between 3V and 5.5V. Also, an example VOUT may vary from 0.5 to 3.3V. All of these variances can cause the inductor current ripple to vary. The inductor current ripple variance means the appropriate peak current value for the PFM pulse in a high ripple condition causes significant voltage ripple in low ripple conditions. Alternatively, the appropriate PFM pulse in a low ripple condition causes inefficiency and mode bounce in high ripple conditions.

In the described examples, the controller 148 adjusts the PFM pulse peak current value responsive to inductor current ripple in the PWM mode. In some examples, a comparator of the peak control circuitry 158 is used to control the limit peak current in the PWM mode and to define the PFM pulse peak current value in the PFM mode. The peak threshold may be, for example, a valley current level plus an offset. In some examples, the offset is digitally controlled. In the PFM mode, the controller 148 may set the valley current level to zero and the reference level for the PFM peak current value is defined only with the offset. In the PWM mode, the controller 148 uses a fixed frequency valley current mode to regulate VOUT by adapting the valley current level as needed. In steady state, the controller 148 may start the HS period when a comparator of the valley control circuitry 155 triggers. The LS period starts when the comparator of the peak control circuitry 158 triggers or a switch clock rising edge occurs.

In some examples, the controller 148 selects a default value for the offset to define the HS peak current limit level to be higher than the maximum inductor current ripple in fixed frequency operation. Therefore, the HS peak current limit comparator will not trigger at all in steady state when the switching converter operates below the positive current limit and above a light load condition. When the load current goes low enough and the controller 148 detects the light load condition in PWM mode, the controller 148 decreases the HS peak comparator reference level by reducing the offset. In some examples, the reference level is reduced until the peak comparator triggers, the digital control saturates to a minimum value, or the light load condition disappears. If the light load condition disappears, the controller 148 cancels PFM mode entry and the peak comparator reference level is set back to a default value. If the peak comparator triggers, the controller 148 increases a digitally controlled digital-to-analog converter (DAC) value one step and stores the DAC value to a register to define the reference level for the PFM peak current value. In some examples, the controller 148 selects the reference level to be equal with the inductor current ripple in the PWM mode. If the digital control saturates to a minimum value, the controller 148 stores a minimum value to a register to define the reference level for the PFM peak current value. Once the offset is adjusted, the controller 148 allows PFM mode entry and the PFM pulse peak current value is defined based on the stored reference value. Using the stored register value, the PFM pulse size may equal the inductor current ripple in the PWM mode and mode transition can be done seamlessly.

In some examples, the controller 148 selects the PFM pulse size to be higher (e.g., 400 mA) than the inductor current ripple in the PWM mode by adding an offset to the stored reference value. The offset between the PFM pulse size and the inductor current ripple may be selected, for example, to optimize PFM mode efficiency and to achieve hysteresis between the PWM and PFM mode. In some examples, the controller 148 may control a fixed-frequency buck converter. In such examples, the PFM pulse may be adjusted based on the inductor current ripple in the PWM mode. In other examples, the described controller 148 may control an on-time controlled buck converter. In such examples, the on-time of the HS switch 120 is adjusted based on VIN and VOUT, and the on-time of the LS switch 128 is adjusted based on valley current control. Other switching converter topologies and related control options are possible. In some examples, the controller 148 compensates for variances in VIN, VOUT, the inductance of the inductor 136, and/or the operating frequency to achieve seamless transitions between PFM and PWM modes, optimized efficiency, and a target VOUT ripple. In some examples, the controller 148 reduces system cost by enabling a lower COUT value and having a low silicon area (e.g., due to use of the positive current limit comparator without needing a separate comparator, on-time sense circuitry, or current sense circuitry). In some examples, the mode control logic 170 of the controller 148 implements a mode transition algorithm or state machine and a DAC, where the DAC controls the reference level for the peak control circuitry 158.

Figure 2:
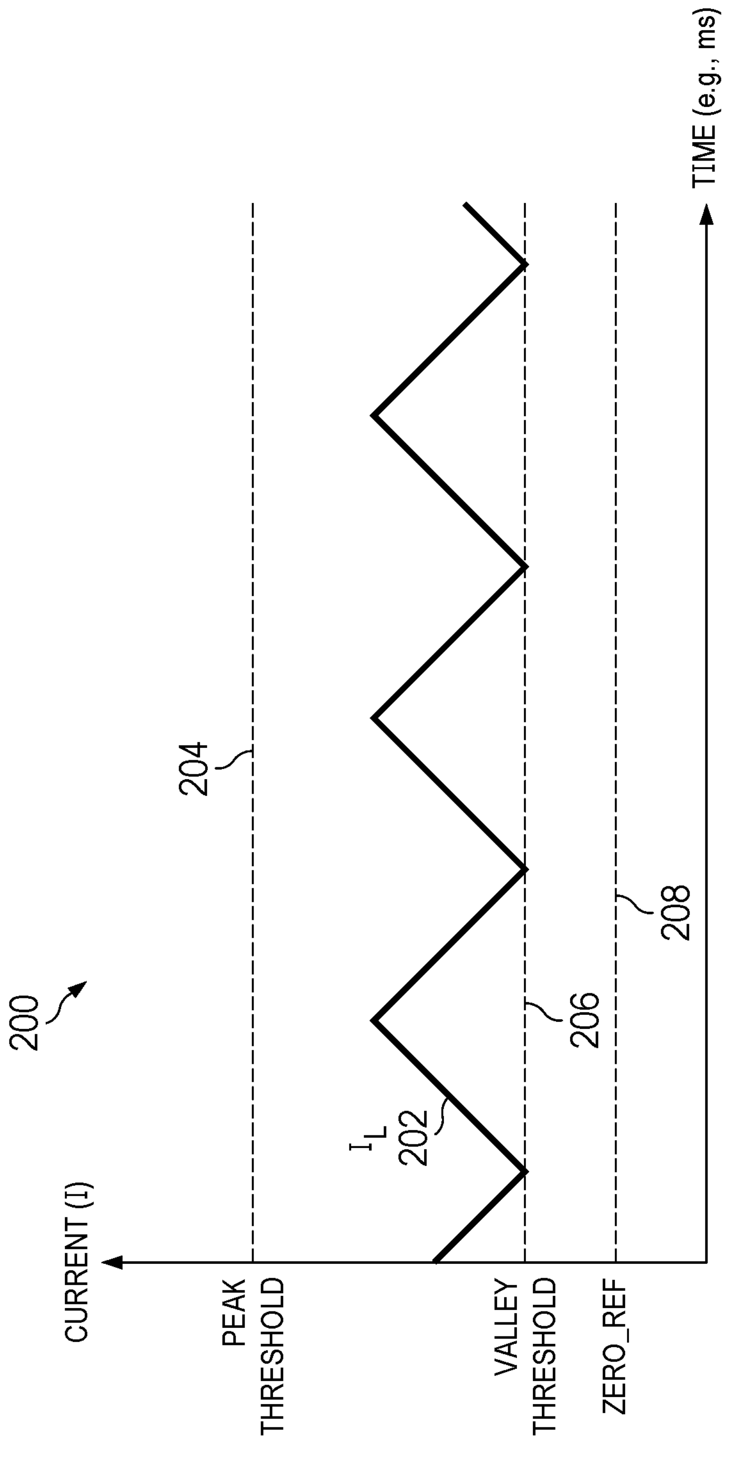
FIG. 2 is a diagram showing an inductor current and thresholds of the example controller of FIG. 1.

FIG. 2 is a diagram 200 showing a sensed inductor current (IL) 202 and thresholds of the example controller 148 of FIG. 1. In some examples, IL 202 may be a current or voltage sense signal, generated by the controller 148, based on the current in the inductor 136. The peak threshold 204 is used to trigger when $I_L$ reaches a target peak current level. In some examples, the peak threshold 204 is based on a control current (I_CTRL) plus a ripple current (I_RIPPLE) multiplied with the power stage sense gain. The valley threshold 206 is used to trigger when $I_L$ reaches a target valley current level. In some examples, the valley threshold 206 is based on a control current (I_CTRL herein) minus an offset current (I_OFFSET herein) multiplied by a power stage sense gain. The light load threshold (ZERO_REF herein) 208 is a reference level used to indicate a light load condition. In some examples, the light load threshold 208 is based on a zero IL current level. In the example of FIG. 2, IL is a sensed value, which may be scaled for use by the controller 148 relative to the current in the inductor 136.

Figure 3:
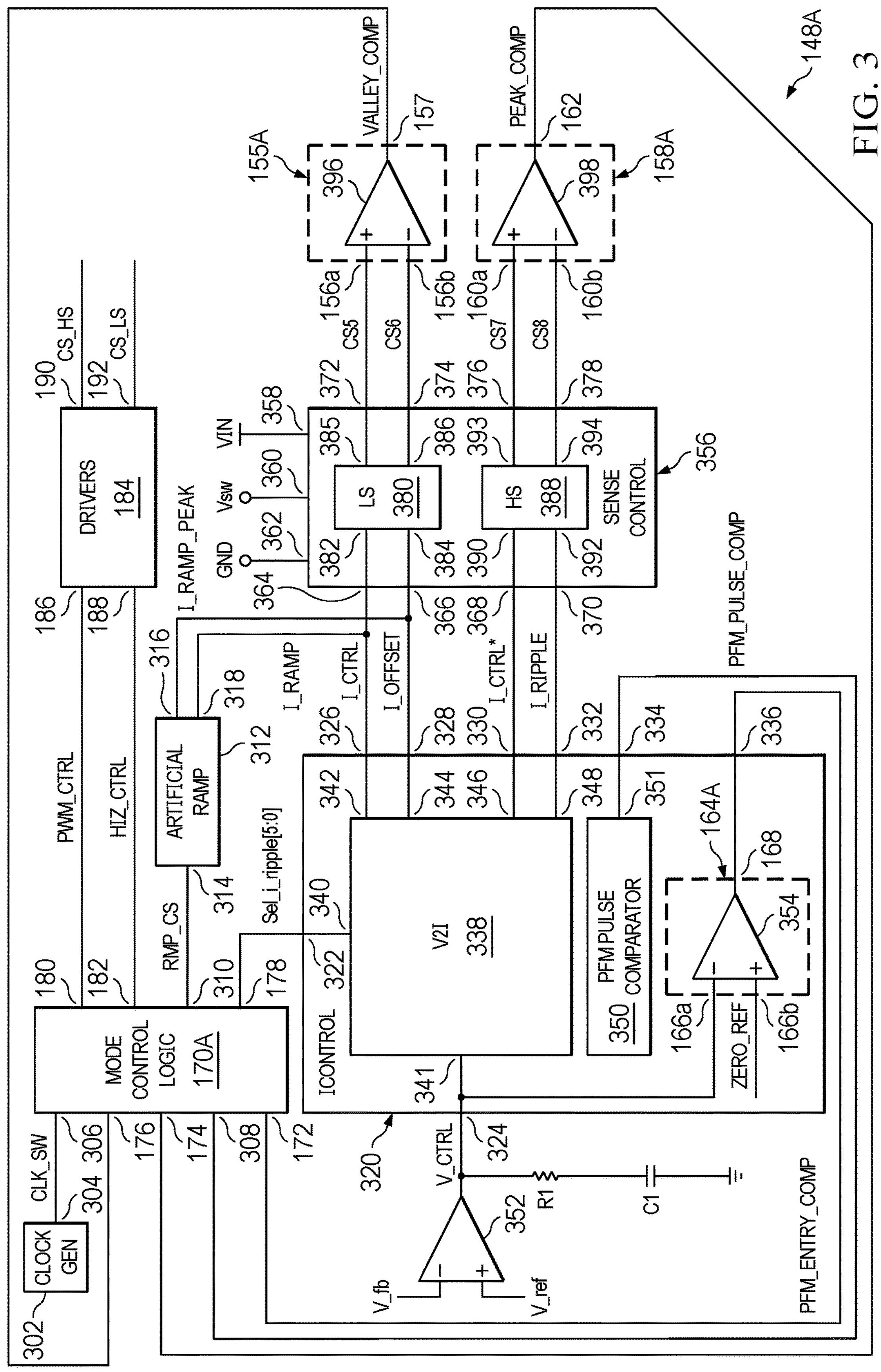
FIG. 3 is a diagram showing example components of a switching converter controller.

FIG. 3 is a diagram showing example components of a switching converter controller 148A. The switching converter controller 148A is an example of the controller 148 of FIG. 1. As shown, the switching converter controller 148A includes a clock generator 302, mode control logic 170A, driver circuitry 184, artificial ramp circuitry 312, an error amplifier 352, a resistor R1, a capacitor C1, current control ("ICONTROL") circuitry 320, sense control circuitry 356, valley control circuitry 155A, and peak control circuitry 158A. The mode control logic 170A is an example of the mode control logic 170 in FIG. 1. The valley control circuitry 155A is an example of the valley control circuitry 155 in FIG. 1, The peak control circuitry 158A is an example of the peak control circuitry 158 in FIG. 1.

The clock generator 302 has a terminal 304. The mode control logic 170A has the first terminal 172, the second terminal 174, the third terminal 176, the fourth terminal 178, the fifth terminal 180, the sixth terminal 182, a seventh terminal 306, an eight terminal 308, and a ninth terminal 310. The artificial ramp circuitry 312 has a first terminal 314, a second terminal 316, and a third terminal 318. The error amplifier 352 has an inverting ("−") input, a non-inverting ("+") input, and an output. The resistor R1 has a first terminal and a second terminal. The capacitor C1 has a first terminal and a second terminal.

The current control circuitry 320 has a first terminal 322, a second terminal 324, a third terminal 326, a fourth terminal 328, a fifth terminal 330, a sixth terminal 332, a seventh terminal 334, and an eighth terminal 336. In the example of FIG. 3, the current control circuitry 320 includes voltage-to-current (V2I) circuitry 338, a PFM pulse comparator 350, and light load detection circuitry 164A. The light load detection circuitry 164A is an example of the light load detection circuitry 164 in FIG. 1. The V2I circuitry 338 has a first terminal 340, a second terminal 341, a third terminal 342, a fourth terminal 344, and a fifth terminal 346, and a sixth terminal 348. The PFM pulse comparator has a terminal 351. The light load detection circuitry 164A has a first input 166*a*, a second input 166*b*, and the output 168 described in FIG. 1. The first and second inputs 166*a* and 166*b* are examples of the input(s) 166 in FIG. 1.

The sense control circuitry 356 has a first terminal 358, a second terminal 360, a third terminal 362, a fourth terminal 364, a fifth terminal 366, a sixth terminal 368, a seventh terminal 370, an eighth terminal 372, a ninth terminal 374, a tenth terminal 376, and an eleventh terminal 378. In the example of FIG. 3, the sense control circuitry 356 includes LS sense circuitry 380 and HS sense circuitry 388. The LS sense circuitry 380 has a first terminal 382, a second terminal 384, a third terminal 385, and a fourth terminal 386. The HS sense circuitry 388 has a first terminal 390, a second terminal 392, a third terminal 393, and a fourth terminal 394. The valley control circuitry 155A has a first input 156*a*, a second input 156*b*, and an output 157. The peak control circuitry 158A has a first input 160*a*, a second input 160*b*, and an output 162.

In the example of FIG. 3, the first terminal 172 of the mode control logic 170A is coupled to the eighth terminal 336 of the current control circuitry 320. The second terminal 174 of the mode control logic 170A is coupled to the output 162 of the peak control circuitry 158A. The third terminal 176 of the mode control logic 170A is coupled to the output 157 of the valley control circuitry 155A. The fourth terminal 178 of the mode control logic 170A is coupled to the first terminal 322 of the current control circuitry 320. The fifth terminal 180 of the mode control logic 170A is coupled to the first terminal 186 of the driver circuitry 184. The sixth terminal 182 of the mode control logic 170A is coupled to the second terminal 188 of the driver circuitry 184. The seventh terminal 306 of the mode control logic 170A is coupled to the terminal 304 of the clock generator 302. The eighth terminal 308 of the mode control logic 170A is coupled to the seventh terminal 334 of the current control circuitry 320. The ninth terminal 310 of the mode control logic 170A is coupled to the first terminal 314 of the artificial ramp circuitry 312.

The inverting ("−") input of the error amplifier 352 receives a feedback voltage (V_fb). V_fb may be VOUT of a power stage (e.g., the power stage 106 in FIG. 1) or a scaled version of VOUT. The non-inverting ("+") input of the error amplifier 352 receives a reference voltage (V_ref). In some examples, V_ref is a target VOUT for the switching converter controller 148A. In other examples, V_ref is a scaled version of the target VOUT. The output of the error amplifier 352 is coupled to the second terminal 324 of the current control circuitry 320. The first terminal of the resistor R1 is coupled to the output of the error amplifier 352 and the second terminal 324 of the current control circuitry 320. The second terminal of the resistor R1 is coupled to the first terminal of the capacitor C1. The second terminal of the capacitor C1 is coupled to a ground terminal.

The third terminal 326 of the current control circuitry 320 is coupled to the fourth terminal 364 of the sense control circuitry 356. The second terminal 316 of the artificial ramp circuitry 312 is also coupled to fourth terminal 364 of the sense control circuitry 356. The fourth terminal 328 of the current control circuitry 320 is coupled to the fifth terminal 366 of the sense control circuitry 356. The third terminal 318 of the artificial ramp circuitry 312 is also coupled to fifth terminal 366 of the sense control circuitry 356. The fifth terminal 330 of the current control circuitry 320 is coupled to the sixth terminal 368 of the sense control circuitry 356. The sixth terminal 332 of the current control circuitry 320 is coupled to the seventh terminal 370 of the sense control circuitry 356.

As shown, the first terminal 340 of the V2I circuitry 338 is coupled to the first terminal 322 of the current control circuitry 320. The second terminal 341 of the V2I circuitry 338 is coupled to the second terminal 324 of the current control circuitry 320. The third terminal 342 of the V2I circuitry 338 is coupled to the third terminal 326 of the current control circuitry 320. The fourth terminal 344 of the V2I circuitry 338 is coupled to the fourth terminal 328 of the current control circuitry 320. The fifth terminal 346 of the V2I circuitry 338 is coupled to the fifth terminal 330 of the current control circuitry 320. The sixth terminal 348 of the V2I circuitry 338 is coupled to the sixth terminal 332 of the current control circuitry 320. The terminal 351 of the PFM pulse comparator 350 is coupled to the seventh terminal 334 of the current control circuitry 320.

As shown, the first input 166*a* of the light load detection circuitry 164A is coupled to the second terminal 324 of the current control circuitry 320. The second input 166*b* of the light load detection circuitry 164A receives a light load reference voltage (ZERO_REF). In some examples, ZERO_REF is provided by a voltage source or adjustable voltage source. The output 168 of the light load detection circuitry 164A is coupled to the eighth terminal 336 of the current control circuitry 320.

In the example of FIG. 3, the first terminal 382 of the LS sense circuitry 380 is coupled to the fourth terminal 364 of the sense control circuitry 356. The second terminal 384 of the LS sense circuitry 380 is coupled to the fifth terminal 366 of the sense control circuitry 356. The third terminal 385 of the LS sense circuitry 380 is coupled to the eighth terminal 372 of the sense control circuitry 356. The fourth terminal 386 of the LS sense circuitry 380 is coupled to the ninth terminal 374 of the sense control circuitry 356.

In the example of FIG. 3, the first terminal 390 of the HS sense circuitry 388 is coupled to the sixth terminal 368 of the sense control circuitry 356. The second terminal 392 of the HS sense circuitry 388 is coupled to the seventh terminal 370 of the sense control circuitry 356. The third terminal 393 of the HS sense circuitry 388 is coupled to the tenth terminal 376 of the sense control circuitry 356. The fourth terminal 394 of the HS sense circuitry 388 is coupled to the eleventh terminal 378 of the sense control circuitry 356.

In some examples, the light load detection circuitry 164A includes a comparator 354 having an inverting ("−") input, a non-inverting ("+") input, and an output. The inverting ("−") input of the comparator 354 is coupled to the first input 166*a* of the light load detection circuitry 164A. The non-inverting ("+") input of the comparator 354 is coupled to the second input 166*b* of the light load detection circuitry 164A. The output of the comparator 354 is coupled to the output 168 of the light load detection circuitry 164A.

In some examples, the valley control circuitry 155A includes a comparator 396 having an inverting ("−") input, a non-inverting ("+") input, and an output. The non-inverting ("+") input of the comparator 396 is coupled to the first input 156*a* of the valley control circuitry 155A. The inverting ("−") input of the comparator 396 is coupled to the second input 156*b* of the valley control circuitry 155A. The output of the comparator 396 is coupled to the output 157 of the valley control circuitry 155A.

In some examples, the peak control circuitry 158A includes a comparator 398 having an inverting ("−") input, a non-inverting ("+") input, and an output. The non-inverting ("+") input of the comparator 398 is coupled to the first input 160*a* of the peak control circuitry 158A. The inverting ("−") input of the comparator 398 is coupled to the second input 160*b* of the peak control circuitry 158A. The output of the comparator 398 is coupled to the output 162 of the peak control circuitry 158A.

In the example of FIG. 3, the clock generator 302 is configured to provide a switching clock signal (CLK_SW) at its terminal 304. The error amplifier 352 is configured to: receive V_fb at its inverting ("−") input; receive V_ref at its non-inverting ("+") input; and provide an error result (V_CTRL) at its output responsive to V_fb and V_ref. The current control circuitry 320 is configured to: receive a ripple control signal (CS4 in FIG. 1, or SEL_I_RIPPLE [5:0] in FIG. 3) at its first terminal 322; receive V_CTRL at its second terminal 324; provide a current control signal (I_CTRL) at its third terminal 326 responsive to V_CTRL; provide another current control signal (I_CTRL* at its fifth terminal 330 responsive to V_CTRL (e.g., I_CTRL* may be equal and opposite in sign relative to I_CTRL); provide an offset control signal (I_OFFSET) at its fourth terminal 328 (e.g., I_OFFSET may be a constant current); provide a ripple current signal (I_RIPPLE) at its sixth terminal 332 responsive to the ripple control signal; provide a PFM pulse comparison result (PFM_PULSE_COMP) at its seventh terminal 334 responsive to V_CTRL; and provide a PFM mode entry signal (PFM_ENTRY_COMP) based on V_CTRL, ZERO_REF and the operations of the light load detection circuitry 164A. In the example of FIG. 3, the ripple control signal is a 6-bit digital signal. In other examples, the ripple control signal may have a different number of bits or may be an analog signal.

More specifically, the V2I circuitry 338 is configured to: receive the ripple control signal at its first terminal 340; receive V_CTRL at its second terminal 341; provide I_CTRL at its third terminal 342 and its fifth terminal 346 responsive to V_CTRL; provide I_OFFSET at its fourth terminal 344 (e.g., I_OFFSET may have a constant value that defines how much inductor valley current below zero is needed in some scenarios, such as negative inductor current to scale down VOUT during shutdown); and provide I_RIPPLE at its sixth terminal 348 responsive to the ripple control signal. In some examples, digital control of I_RIPPLE provides the benefit of storing the value for a long time in a register with a relatively small silicon area. Step control, programming options, and offset control are also facilitated. In an analog solution, I_RIPPLE may be stored to a capacitor, which may limit storage duration or result in other leakage issues. In some examples, the V2I circuitry 338 may include a DAC, a register, and/or a transconductance amplifier.

The light load detection circuitry 164A is configured to: receipt V_CTRL at its first input 166*a*; receive ZERO_REF at its second input 166*b*; and provide PFM_ENTRY_COMP at its output 168 responsive to V_CTRL and ZERO_REF. In the example of FIG. 3, the comparator 354 of the light load detection circuitry 164A is configured to: receive V_CTRL at its inverting ("−") input; receive ZERO_REF at its non-inverting ("+") input; and provide a comparison result (e.g., PFM_ENTRY_COMP) at its output responsive to V_CTRL and ZERO_REF.

In some examples, the PFM pulse comparator 350 is configured to provide PFM PULSE_COMP at its terminal 351 responsive to V_CTRL. A higher V_CTRL results in PFM_PULSE_COMP triggering a higher frequency. A lower V_CTRL results in PFM_PULSE_COMP triggering a lower frequency. PFM_PULSE_COMP is used to initiate a PFM pulse (e.g., to start an HS interval) during PFM mode operations.

The sense control circuitry 356 is configured to: receive VIN at its first terminal 358; receive $V_{SW}$ at its second terminal 360; couple to ground at its third terminal 362; receive I_CTRL plus a ramp current (I_RAMP herein) at its fourth terminal 364 responsive to I_CTRL and the operations of the artificial ramp circuitry 312; receive a ramp current peak (I_RAMP_PEAK herein) plus I_OFFSET at its fifth terminal 366 responsive to I_OFFSET and the operations of the artificial ramp circuitry 312; receive I_CTRL at its sixth terminal 368; receive I_RIPPLE at its seventh terminal 370; provide a first control signal (CS5) at its eighth terminal 372 responsive to $V_{SW}$ and ground; provide a second control signal (CS6) at its ninth terminal 374 responsive to the ramped I_OFFSET; provide a third control signal (CS7) at its tenth terminal 376 responsive to VIN and $V_{SW}$; and provide a fourth control signal (CS8) at its eleventh terminal 378 responsive to I_RIPPLE. In some examples, the CS5 is a current sense signal during a LS on state, CS6 is a valley threshold, CS7 is a current sense signal during a HS on state, and CS8 is a peak threshold.

More specifically, the LS sense circuitry 380 is configured to: receive the ramped I_CTRL at its first terminal 382; receive the ramped I_OFFSET at its second terminal 384; provide CS4 at its third terminal 385 responsive to the ramped I_CTRL and the ramped I_OFFSET; and provide CS5 at its fourth terminal 386 responsive to the ramped I_CTRL and the ramped I_OFFSET. The HS sense circuitry 388 is configured to: receive I_CTRL at its first terminal 390; receive the I_RIPPLE at its second terminal 392; provide CS6 at its third terminal 393 responsive to I_CTRL and I_RIPPLE; and provide CS7 at its fourth terminal 394 responsive to I_CTRL and I_RIPPLE.

The valley control circuitry 155A is configured to: receive CS5 at its first input 156*a*; receive CS6 at its second input 156*b*; and provide a comparison result (VALLEY_COMP) at its output 157 responsive to CS5 and CS6. In the example of FIG. 3, the comparator 396 of the valley control circuitry 155A is configured to: receive CS5 at its non-inverting ("+") input; receive CS6 at its inverting ("−") input; and provide a comparison result at its output responsive to CS5 and CS6.

The peak control circuitry 158A is configured to: receive CS7 at its first input 160*a*; receive CS8 at its second input 160*b*; and provide a comparison result (PEAK_COMP) at its output 162 responsive to CS7 and CS8. In the example of FIG. 3, the comparator 398 of the peak control circuitry 158A is configured to: receive CS7 at its non-inverting ("+") input; receive CS8 at its inverting ("−") input; and provide a comparison result at its output responsive to CS7 and CS8.

The mode control logic 170A is configured to: receive PFM_ENTRY_COMP at its first terminal 172; receive PEAK_COMP at its second terminal 174; receive VALLEY_COMP at its third terminal 176; receive CLK_SW at its eighth terminal 308; receive PFM_PULSE_COMP at its eighth terminal 308; provide the ripple control signal (e.g., CS4 or SEL_I_RIPPLE [5:0]) at its fourth terminal 178 responsive to PEAK_COMP and PFM_ENTRY_COMP; provide a first control signal (PWM_CTRL) at its fifth terminal 180 responsive to VALLEY_COMP and CLK_SW; provide a second control signal (HIZ_CTRL) at its sixth terminal 182 responsive to PFM_ENTRY_COMP, PFM_pulse_comp, PEAK_COMP, and VALLEY_COMP (e.g., PFM mode is initiated responsive to PFM_ENTRY_COMP and PEAK_COMP, and HIZ_CTRL is controlled during the PFM mode responsive to PFM_PULSE_COMP and VALLEY_COMP); and provide a ramp control signal (RMP_CS) at its ninth terminal 310 responsive to VALLEY_COMP and CLK_SW. In some examples, RMP_CS may be equal to PWM_CTRL during PWM mode operations.

The artificial ramp circuitry 312 is configured to: receive RMP_CS at its first terminal 314; provide a I_RAMP_PEAK at its second terminal 316 responsive to RMP_CS; and provide I_RAMP at its third terminal 318 responsive to RMP_CS. In some examples, I_RAMP_PEAK is equal to the peak value of I_RAMP. In steady state, I_RAMP_PEAK is constant, but I_RAMP and I_RAMP_PEAK may vary as a function of VIN and VOUT. In some examples, the artificial ramp circuitry 312 is configured to reset and provides I_RAMP at the third terminal 318 responsive to RMP_CS being de-asserted. During an LS interval, I_RAMP increases. In contrast, I_RAMP_PEAK at the second terminal 316 is a peak ramp current value that remains constant. During PFM mode operations, the artificial ramp circuitry 312 is not used, or the values at second terminal 316 and the third terminal 318 may be zero out. In some examples, the artificial ramp circuitry 312 may include an additional input (not shown) coupled to the mode control logic 170A to receive a PFM mode indication for RMP_CS control.

The driver circuitry 184 is configured to: receive PWM_CTRL at its first terminal 186; receive HIZ_CTRL at its second terminal 188; provide CS_HS at its third terminal 190 responsive to PWM_CTRL and HIZ_CTRL; and provide CS_LS at its fourth terminal 192 responsive to PWM_CTRL and HIZ_CTRL. In some examples, the driver circuitry 184 may operate to provide CS_HS and CS_LS responsive PWM_CTRL during PWM mode operations, where PWM_CTRL is based on CLK_SW and VALLEY_COMP. During PFM mode operations, the driver circuitry 184 may operate to provide CS_HS and CS_LS responsive to PWM_CTRL and HIZ_CTRL, where these control signals are based on PFM_PULSE_COMP, VALLEY_COMP and PEAK_COMP. More specifically, during PFM mode operations, there are three power stage state options (HS, LS, and HIZ) and two control signals may be used for control of these different states. During the HIZ state, HS and LS conduction is avoided. In some examples, if HIZ_CTRL is asserted, PFM_PULSE_COMP may be used to transition the power stage from the HIZ state to the HS state responsive to PWM_CTRL and HIZ_CTRL (e.g., PWM_CTRL=1, and HIZ_CTRL=0). During the HS state, inductor current increases and the power stage transitions to the LS state responsive to IL reaching the peak threshold. In such case, PWM_CTRL may be de-asserted. During the LS state (e.g., PWM_CTRL=0, and HIZ_CTRL=0), the inductor current decreases and the power stage transitions to the HIZ state responsive to VALLEY_COMP reaching the ZERO_REF. In such case, HIZ_CTRL is asserted.

In some examples, the controller 148A is configured to: receive VIN from a power supply (e.g., the power supply 102 in FIG. 1); receive $V_{SW}$ from a power stage; receive VOUT from a power stage; provide HS_CS responsive to VIN, $V_{SW}$, VOUT, and the operations of the error amplifier 352, the current control circuitry 320, the artificial ramp circuitry 312, the sense control circuitry 356, the valley control circuitry 155A, the peak control circuitry 158A, the mode control logic 170A, and the driver circuitry 184; and provide LS_CS responsive to VIN, $V_{SW}$, VOUT, and the operations of the error amplifier 352, the current control circuitry 320, the artificial ramp circuitry 312, the sense control circuitry 356, the valley control circuitry 155A, the peak control circuitry 158A, the mode control logic 170A, and the driver circuitry 184. In some examples, the controller 148A is configured to: sense an inductor current of a power stage responsive to the $V_{SW}$ and VOUT; adjust an offset between a valley threshold and a peak threshold responsive to a light load condition (e.g., inductor current below zero) detected by the light load detection circuitry 164A; and transition from a PWM mode to a PFM mode responsive to the light load condition and a comparison indicating the sensed inductor current reaches the peak threshold. The comparison is performed, for example, by the peak control circuitry 158A.

In some examples, the PFM pulse size is selected to achieve good efficiency and to avoid high VOUT ripple or mode bouncing between the PFM and PWM modes. In some examples, the controller 148A is configured to optimize efficiency by entering the PFM mode at light loads (e.g., when the inductor current goes below zero current in the PWM mode). In a light load scenario, the maximum PFM output current is selected to be larger than the load current to avoid mode bounce and VOUT overshoots or undershoots. In other words, the PFM pulse is selected to be larger than the current ripple in the PWM mode. Example conditions that may cause variance in the inductor current ripple in the PWM mode include variances in VIN, VOUT, operating frequency, and inductance of a power stage's inductor (e.g., the inductor 136 in FIG. 1). All of these variances can cause the inductor current ripple to vary. The inductor current ripple variance means the appropriate peak current value for the PFM pulse in a high ripple condition causes significant voltage ripple in low ripple conditions. Alternatively, the appropriate PFM pulse in low ripple condition causes inefficiency and mode bounce in high ripple conditions.

In some examples, the controller 148A adjusts the PFM pulse peak current value responsive to inductor current ripple in the PWM mode. In some examples, the comparator 398 of the peak control circuitry 158A is used to control the peak current limit in the PWM mode and to define the PFM pulse peak current value in the PFM mode. The peak threshold may be, for example, a valley current level plus an offset. In some examples, the offset is digitally controlled. In the PFM mode, the controller 148A may set the valley current level to zero and the reference level for the PFM peak current value is defined only with the offset. In the PWM mode, the controller 148A uses a fixed frequency valley current mode to regulate VOUT by adapting the valley current level as needed. In steady state, the controller 148A may start the HS period when the comparator 396 of the valley control circuitry 155A triggers. The LS period starts when the comparator 398 of the peak control circuitry 158A triggers or a switch clock rising edge occurs.

In some examples, the controller 148A selects a default value for the offset to define the peak current limit level to be higher than the maximum inductor current ripple in fixed frequency operation. Therefore, the comparator 398 will not trigger at all in steady state when the switching converter operates below the positive current limit and above a light load condition. When the load current goes low enough and the switching converter controller detects the light load condition in PWM mode, the controller 148A decreases the peak comparator reference level by reducing the offset. In some examples, the ripple control signal (or related offset) is reduced until the peak comparator triggers, the ripple control signal (or related offset) saturates to a minimum value, or the light load condition disappears. If the light load condition disappears, the controller 148A cancels PFM mode entry and the peak comparator reference level is set back to a default value. If the peak comparator triggers, the controller 148A increases a DAC value one step and stores the DAC value to a register to define the reference level for the PFM peak current value. In some examples, the DAC and register are included with current control circuitry, such as the current control circuitry 320 of FIG. 3 (e.g., included with the V2I circuitry 338). In some examples, the controller 148A selects the reference level to be equal with the inductor current ripple in the PWM mode. If the ripple control signal (or related offset) saturates to a minimum value, the controller 148A stores a minimum value to a register to define the reference level for the PFM peak current value. Once the ripple control signal (or related offset) is adjusted, the controller 148A allows PFM mode entry and the PFM pulse peak current value is defined based on the stored reference value. Using the stored register value, the PFM pulse size may equal the inductor current ripple in the PWM mode and mode transition can be done seamlessly.

In some examples, the controller 148A selects the PFM pulse size to be higher (e.g., 400 mA) than the inductor current ripple in the PWM mode by adding an offset to the stored reference value. The offset between the PFM pulse size and the inductor current ripple may be selected, for example, to optimize PFM mode efficiency and to achieve hysteresis between the PWM and PFM mode. In some examples, the controller 148A may control a fixed-frequency buck converter. In such examples, the PFM pulse may be adjusted based on the inductor current ripple in the PWM mode. In other examples, the controller 148A may control an on-time controlled buck converter. In such examples, the on-time of a HS switch (e.g., the HS switch 120 in FIG. 1) and a LS switch (e.g., the LS switch 128 in FIG. 1) is adjusted based on VIN, VOUT, or a programmable PFM peak current value. Other switching converter topologies and related control options are possible. In some examples, the controller 148A compensates for variances in VIN, VOUT, the inductance of the power stage inductor (e.g., the inductor 136 in FIG. 1), and/or the operating frequency to achieve seamless transitions between PFM and PWM modes, optimized efficiency, and a target VOUT ripple. In some examples, the controller 148A reduces system cost by enabling a lower COUT value and having a low silicon area (e.g., due to use of the positive current limit comparator without needing a separate comparator, on-time sense circuitry, or current sense circuitry).

Figure 4:
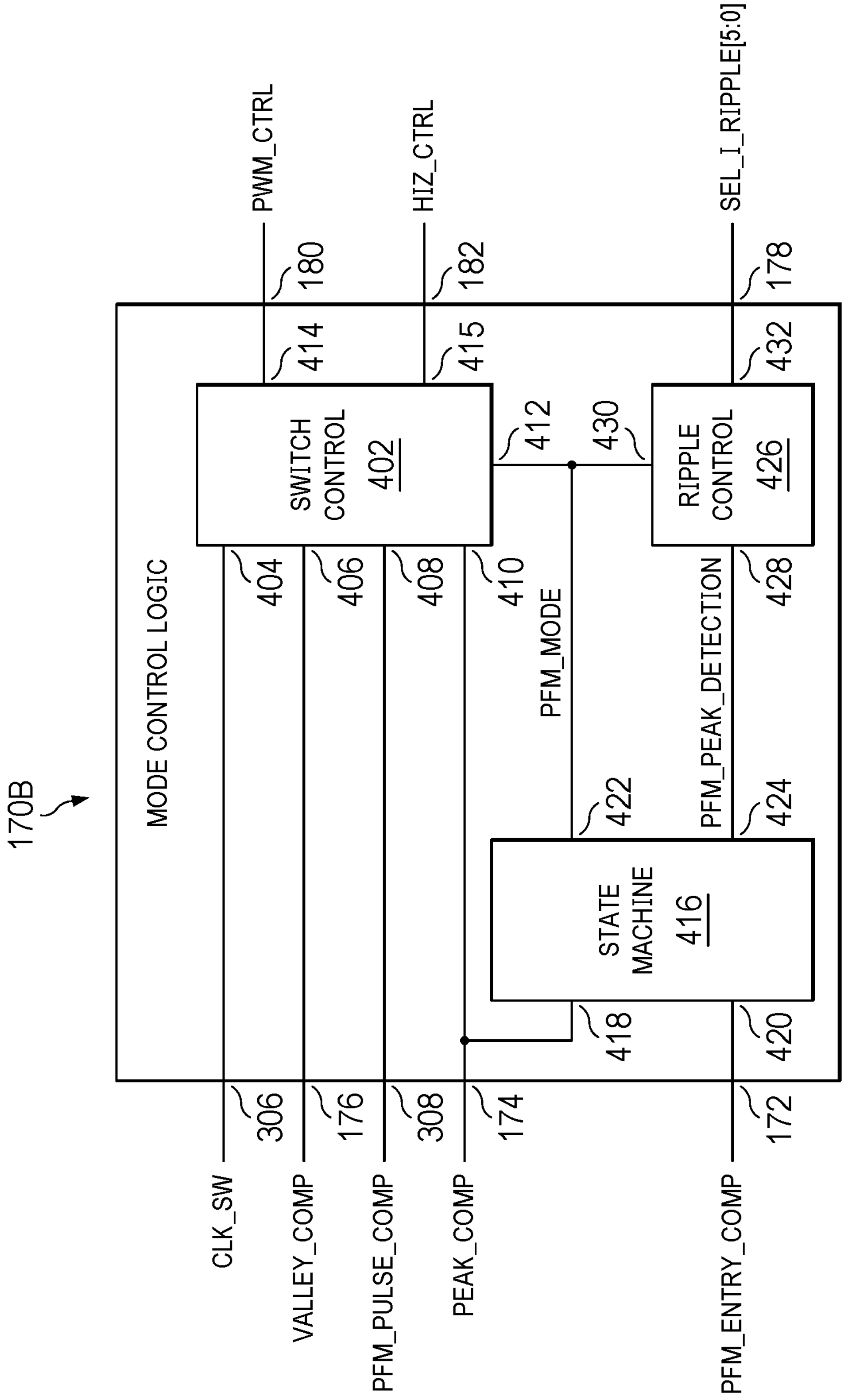
FIG. 4 is a diagram showing an example of mode control logic for a switching converter controller.

FIG. 4 is a diagram showing an example of mode control logic 170B for a switch converter controller. The mode control logic 170B is an example of the mode control logic 170 in FIG. 1, or the mode control logic 170A in FIG. 3. As shown, the mode control logic 170B has the first terminal 172, the second terminal 174, the third terminal 176, the fourth terminal 178, the fifth terminal 180, and the sixth terminal 182 described in FIGS. 1 and 3. The mode control logic 170B also has the seventh terminal 306 and the eighth terminal 308 described in FIG. 3. Omitted from the mode control logic 170B is the ninth terminal 310 described in FIG. 3. In some examples, the mode control logic 170B may include the ninth terminal 310. In such examples, the mode control logic 170B may use the switch control logic 402 to provide RMP_CS (not shown) responsive to PWM_CTRL and a PFM mode indicator.

In the example of FIG. 4, the mode control logic 170B includes switch control logic 402, state machine logic 416, and ripple control logic 426. The switch control logic 402 has a first terminal 404, a second terminal 406, a third terminal 408, a fourth terminal 410, a fifth terminal 412, a sixth terminal 414, and a seventh terminal 415. The state machine logic 416 has a first terminal 418, a second terminal 420, a third terminal 422, and a fourth terminal 424. The ripple control logic 426 has a first terminal 428, a second terminal 430, and a third terminal 432.

In the example of FIG. 4, the first terminal 404 of the switch control logic 402 is coupled to the seventh terminal 306 of the mode control logic 170B. The second terminal 406 of the switch control logic 402 is coupled to the third terminal 176 of the mode control logic 170B. The third terminal 408 of the switch control logic 402 is coupled to the eighth terminal 308 of the mode control logic 170B. The fourth terminal 410 of the switch control logic 402 is coupled to the second terminal 174 of the mode control logic 170B. The sixth terminal 414 of the switch control logic 402 is coupled to the fifth terminal 180 of the mode control logic 170B. The seventh terminal 415 of the switch control logic 402 is coupled to the sixth terminal 182 of the mode control logic 170B.

The first terminal 418 of the state machine logic 416 is coupled to the second terminal 174 of the mode control logic 170B. The second terminal 420 of the state machine logic 416 is coupled to the first terminal 172 of the mode control logic 170B. The third terminal 422 of the state machine logic 416 is coupled to the fifth terminal 412 of the switch control logic 402 and to the second terminal 430 of the ripple control logic 426. The fourth terminal 424 of the state machine logic 416 is coupled to the first terminal 428 of the ripple control logic 426. The third terminal 432 of the ripple control logic 426 is coupled to the fourth terminal 178 of the mode control logic 170B.

In the example of FIG. 4, the mode control logic 170B is configured to: receive PFM_ENTRY COMP at its first terminal 172; receive PEAK_COMP at its second terminal 174; receive VALLEY_COMP at its third terminal 176; receive CLK_SW at its seventh terminal 306; receive PFM_PULSE_COMP at its eighth terminal 308; provide a ripple control signal (e.g., CS4 or SEL_I_RIPPLE [5:0]) at its fourth terminal 178 responsive to PEAK_COMP and PFM_ENTRY_COMP; provide PWM_CTRL at its fifth terminal 180 responsive to CLK_SW, VALLEY_COMP, PEAK_COMP, and PFM_ENTRY_COMP; and provide HIZ_CTRL at its sixth terminal 182 responsive to PFM_PULSE_COMP, PEAK_COMP, VALLEY_COMP, and PFM_ENTRY_COMP.

More specifically, the state machine logic 416 is configured to: receive PEAK_COMP at its first terminal 418; receive PFM_ENTRY_COMP at its second terminal 420; provide a PFM mode signal (PFM_MODE) at its third terminal 422 responsive to PEAK_COMP and PFM_ENTRY_COMP; and provide a PFM peak detection signal (PFM_PEAK_DETECTION) at its fourth terminal responsive to PEAK_COMP and PFM_ENTRY COMP.

The ripple control logic 426 is configured to: receive PFM_PEAK_DETECTION at its first terminal 428; receive PFM_MODE at its second terminal 430; and provide the ripple control signal at its third terminal 432 responsive to PFM_PEAK_DETECTION, PFM_MODE, and a timer (e.g., included with the ripple control logic 426). After PFM_MODE is asserted, the ripple control logic 426 lowers the ripple control signal periodically as needed until PFM_PEAK_DETECTION is asserted or PFM mode entry is canceled.

The switch control logic 402 is configured to: receive CLK_SW at its first terminal 404; receive VALLEY_COMP at its second terminal 406; receive PFM_PULSE_COMP at its third terminal 408; receive PEAK_COMP at its fourth terminal 410; receive PFM_MODE at its fifth terminal 412; provide PWM_CTRL at its sixth terminal 414 responsive to CLK_SW, VALLEY_COMP, PFM_MODE, and PEAK_COMP; and provide HIZ_CTRL at its seventh terminal 415 responsive to PFM_PULSE_COMP, PEAK_COMP, VALLEY_COMP, and PFM MODE.

Figure 5:
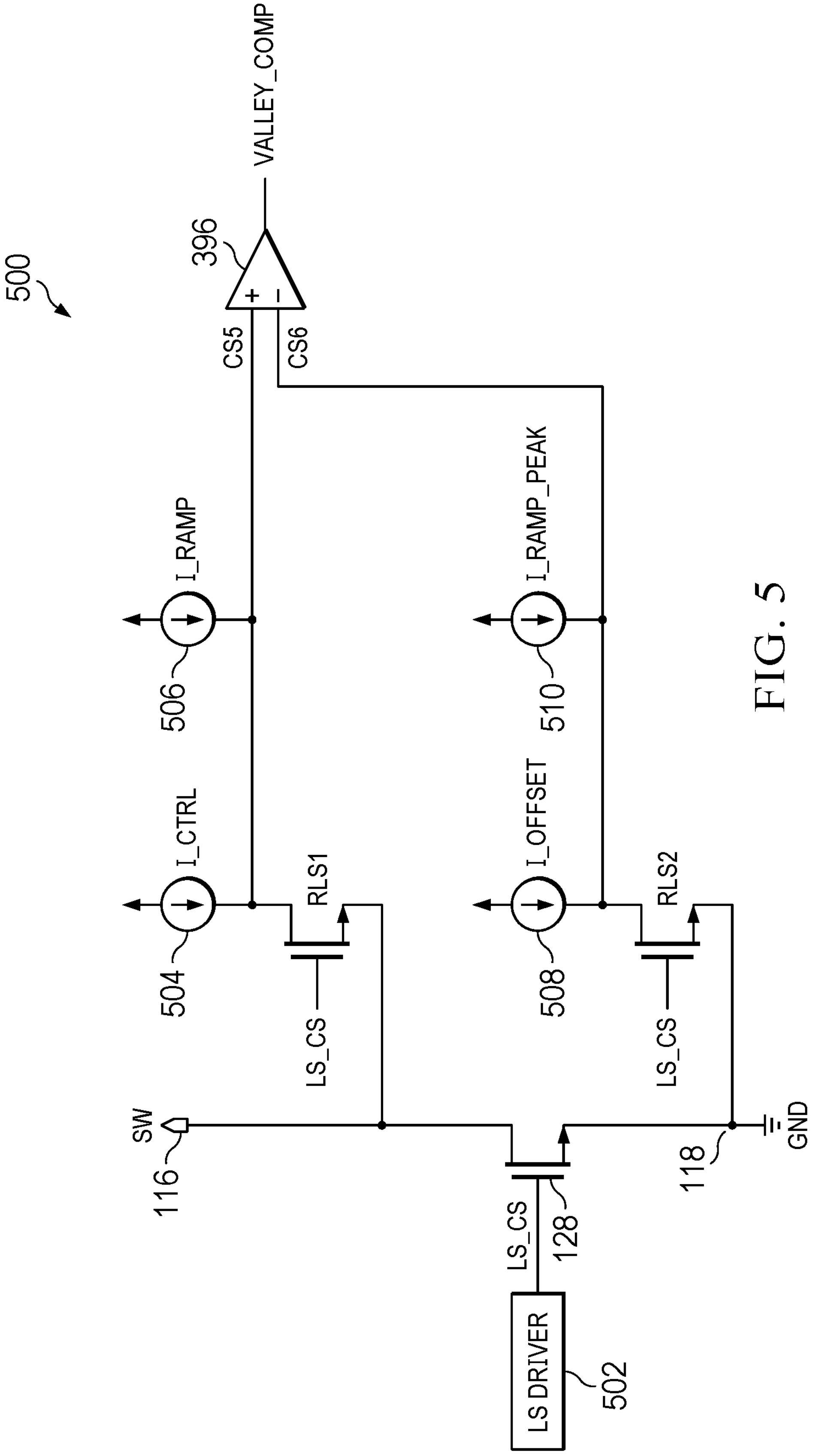
FIG. 5 is a circuit diagram showing example circuitry related to inductor current valley detection operations.

FIG. 5 is a circuit diagram showing example circuitry 500 related to inductor current valley detection operations. In the example of FIG. 5, the circuitry 500 includes LS driver circuitry 502, the LS switch 128, a first replica LS switch (RLS1), a second replica LS switch (RLS2), an I_CTRL current source 504, an I_RAMP current source 506, an I_OFFSET current source 508, an I_RAMP_PEAK current source 510, and the comparator 396 in the arrangement shown. In the example of FIG. 5, the LS driver circuitry 502 may be part of the driver circuitry 184 of FIG. 1. The LS switch 128 is part of the power stage 106 of FIG. 1. The replica switches RLS1 and RLS2 are part of the LS sense circuitry 380 of FIG. 3. In the example of FIG. 5, the LS switch 128 is an n-channel metal-oxide semiconductor (NMOS) transistor having a first terminal, a second terminal, and a control terminal. The replica switches RLS1 and RLS2 are also NMOS transistors, each having a respective first terminal, a respective second terminal, and a respective control terminal. In some examples, the size ratio of the replica switches RLS1 and RLS2 relative to the LS switch 128 results in a sense gain (e.g., 40*k*). In some examples, the I_CTRL current source 504 and I_OFFSET current source 508 are part of the current control circuitry 320 of FIG. 3. In some examples, the I_RAMP current source 506 and the I_RAMP_PEAK current source 510 are part of the artificial ramp circuitry 312 of FIG. 3. The comparator 396 is part of the valley control circuitry 155 of FIG. 1, or the valley control circuitry 155A of FIG. 3.

When the LS switch 128 is turned on responsive to LS_CS, the replica switches RLS1 and RLS2 are also turned on. Accordingly, during the LS interval, I_CTRL+I_RAMP are provided as CS5 to the non-inverting ("+") input of the comparator 396. Also, during the LS interval, I_OFFSET+I_RAMP_PEAK are provided as CS6 to the inverting ("−") input of the comparator 396. When CS5 goes above CS6, VALLEY_COMP is asserted. Otherwise, VALLEY_COMP is de-asserted.

In an example, if I_OFFSET, I_RAMP and I_RAMP_PEAK are zero, I_CTRL only defines the valley current level. In this example CS5 may be equal to $V_{SW}$+I_CTRL*$R_{LS}$*As, where $R_{LS}$ is the resistance of the LS switch 128 when conducting and $A_S$ is the sense gain (e.g., 40*k*) due to the ratio of the LS switch 128 relative to the replica switches RLS1 and RLS2. In contrast, CS6 will be zero in the above example scenario.

If a positive inductor current direction is assumed from the ground terminal 118 to the fifth terminal 116 (or switch node 135), $V_{SW}$=GND-$I_{IND}$*$R_{LS}$, where $I_{IND}$ is the inductor current (e.g., in the inductor 136 in FIG. 1). In such case, CS5 may be equal to GND-$I_{IND}$*$R_{LS}$+I_CTRL*$R_{LS}$*$A_S$. In other words, CS5 may be equal to $R_{LS}$*(I_CTRL*$A_S$-$I_{IND}$). In such case, the comparator 396 triggers once CS5 is greater than CS6. In some examples, if I_CTRL is 25 uA (1/40k), the valley current level related to CS6 will be set to 1A. In such examples, if $I_{IND}$ is 2A in the beginning of the LS interval, the comparator 396 will trigger at 1A when CS5 crosses the zero level set by CS6.

Figure 6:
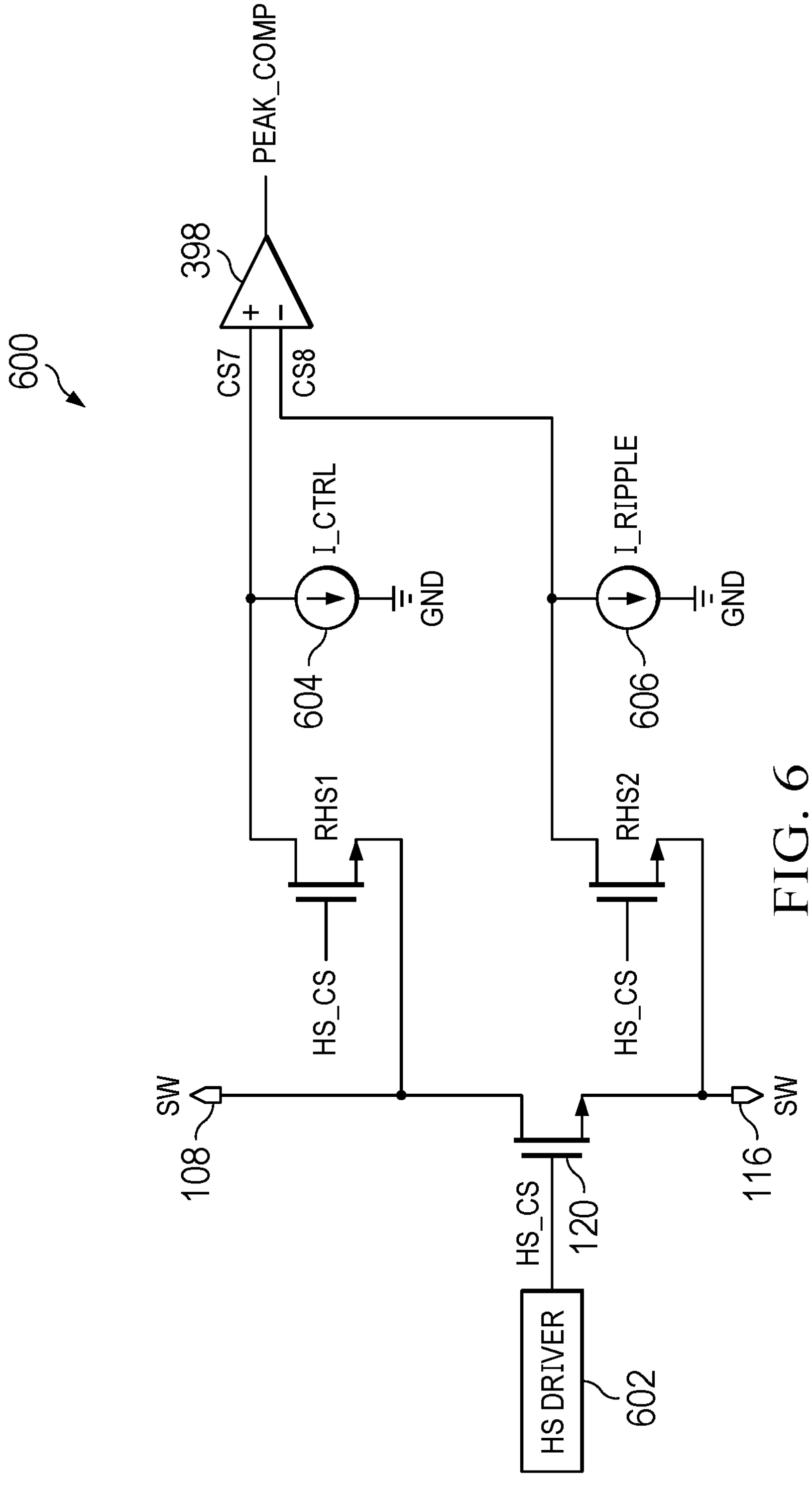
FIG. 6 is a circuit diagram showing example circuitry related to inductor current peak detection operations.

FIG. 6 is a circuit diagram showing example circuitry 600 related to inductor current peak detection operations. In the example of FIG. 6, the circuitry 600 includes HS driver circuitry 602, the HS switch 120, a first replica HS switch (RHS1), a second replica HS switch (RHS2), an I_CTRL current source 604, an I_RIPPLE current source 606, and the comparator 398 in the arrangement shown. In the example of FIG. 6, the HS driver circuitry 602 may be part of the driver circuitry 184 of FIG. 1. The HS switch 120 is part of the power stage 106 of FIG. 1. The replica switches RHS1 and RHS2 are part of the HS sense circuitry 388 of FIG. 3. In the example of FIG. 6, each of the HS switch 120 and the replica switches RLS1 and RLS2 are NMOS transistors, each having a respective first terminal, a respective second terminal, and a respective control terminal. In some examples, the size ratio of the replica switches RHS1 and RHS2 relative to the HS switch 120 results in a sense gain (e.g., 40*k*). In some examples, the I_CTRL current source 604 and I_RIPPLE current source 606 are part of the current control circuitry 320 of FIG. 3. The comparator 398 is part of the peak control circuitry 158 of FIG. 1, or the peak control circuitry 158A of FIG. 3.

When the HS switch 120 is turned on responsive to HS_CS, the replica switches RHS1 and RHS2 are also turned on. Accordingly, during the HS interval, I_CTRL is provided as CS7 to the non-inverting ("+") input of the comparator 398. Also, during the HS interval, I_RIPPLE is provided as CS8 to the inverting ("−") input of the comparator 398. When CS7 goes above CS8, PEAK_COMP is asserted. Otherwise, PEAK_COMP is de-asserted. As described herein, I_RIPPLE may be adjustable for PWM mode and PFM mode operations as well as to facilitate mode transitions.

Figure 7:
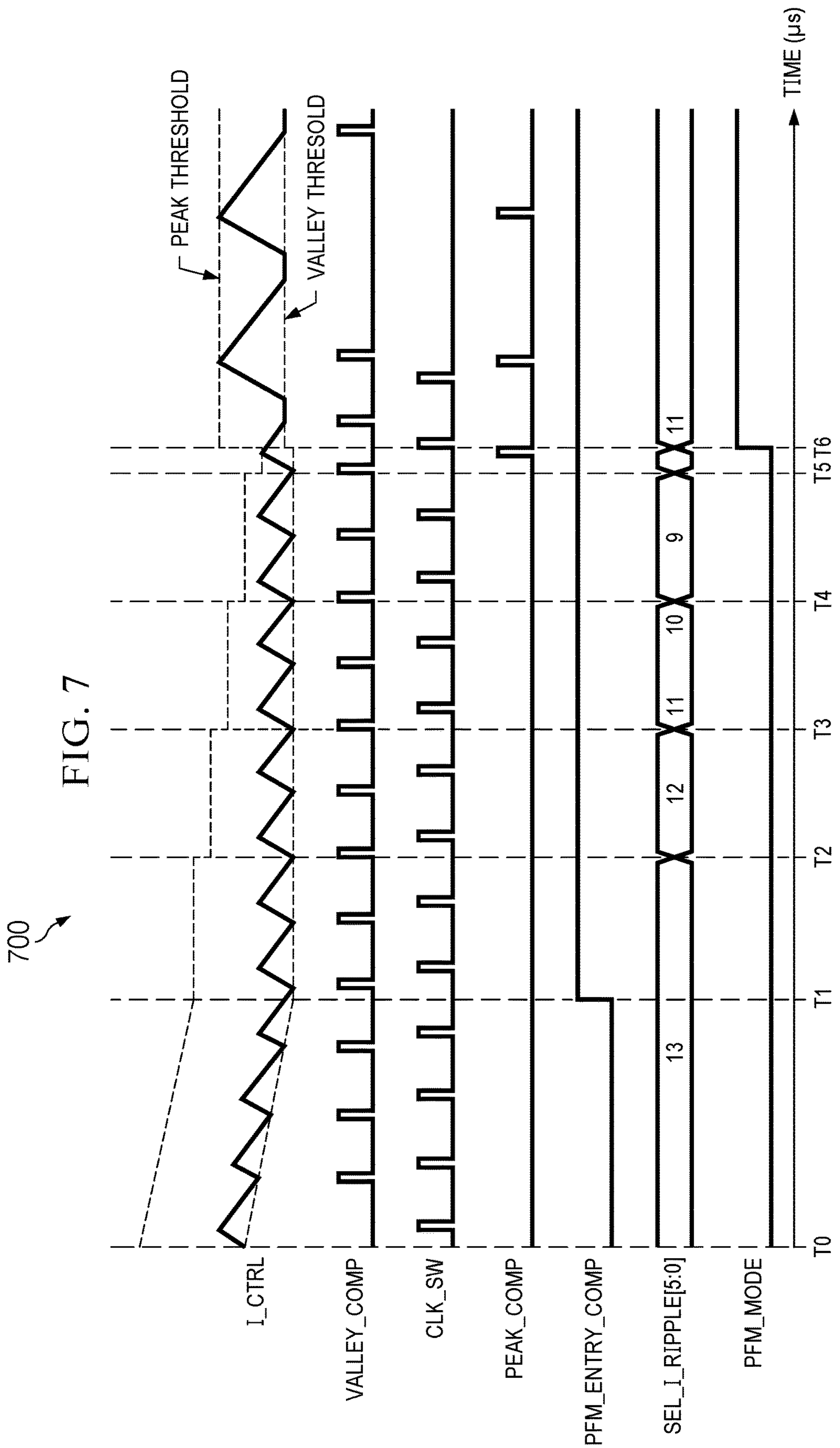
FIG. 7 is a timing diagram showing signals related to an example switching converter controller.

FIG. 7 is a timing diagram 700 showing signals related to an example switching converter controller. In the timing diagram 700, waveforms are represented for I_CTRL, VALLEY_COMP, CLK_SW, PEAK_COMP, PFM_ENTRY_COMP, SEL_I_RIPPLE [5:0], and PFM_MODE. Example peak and valley thresholds are represented in the timing diagram 700 as well as example times TO, T1, T2, T3, T4, T5, and T6. At time TO, I_CTRL is above the PFM entry level and a PWM mode with fixed frequency valley current control is used. In some examples, the valley threshold and peak threshold are functions of I_CTRL and a sense gain. In some examples, the sense gain is the ratio of the HS switch of the power stage relative a HS replica switch included with the HS sense circuitry 388 and/or the ratio of the LS switch of the power stage relative a LS replica switch included with the LS sense circuitry 380. In such examples, the valley threshold is I_CTRL multiplied by the sense gain (e.g., 40*k* or another gain value). Meanwhile, the peak threshold is determined using (I_CTRL+I_RIPPLE) multiplied by the sense gain. During the PWM mode, the timing of CLK_SW and VALLEY_COMP being triggered (i.e., I_CTRL reaching the valley threshold) is used to control timing of the HS and LS switches. From time TO to time T1, a controller (e.g., the controller 148 in FIG. 1, the controller 148A in FIG. 3) adapts the valley point of the inductor current as needed and turns on the HS switch (while the LS switch is turned off) whenever VALLEY_COMP is triggered. The LS switch is turned on (while the HS switch is turned off) responsive to CLK_SW.

As shown, the offset between the peak threshold and the valley threshold is maintained as the valley threshold falls from time T0 to time T1. This offset is adjustable, for example, using the ripple control signal (e.g., CS4 or SEL_I_RIPPLE herein). During the PWM mode, the comparator of the peak control circuitry (e.g., the comparator 398 in FIG. 3) is used for current limit control. At time T1, PFM_ENTRY_COMP is triggered due to I_LOAD reaching a target valley threshold level (e.g., zero current). After PFM_ENTRY_COMP is triggered, the controller may stay in PWM for some interval (e.g., from time T1 to time T6) until mode transition operations are complete. At time T2, the offset between the valley threshold and the peak threshold is reduced by lowering the peak threshold. At time T3, the offset between the valley threshold and the peak threshold is reduced again by lowering the peak threshold. At time T4, the offset between the valley threshold and the peak threshold is reduced again by lowering the peak threshold. At time T5, the offset between the valley threshold and the peak threshold is reduced again by lowering the peak threshold.

In the example of FIG. 7, the offset between the valley threshold and the peak threshold is adjusted responsive to VALLEY_COMP being triggered twice. In other examples, the offset may be adjusted responsive to VALLEY_COMP being triggered a different amount of times (e.g., 1, 3, 4, etc.). In other examples, another timing mechanism is used to trigger offset adjustment until I_CTRL reaches the peak threshold or PFM mode entry is canceled. As another option, the amount of adjustment to the offset each time the offset is lowered may vary (e.g., less adjustment per step or more adjustment per step). In some examples, the peak threshold adjusted by periodically stepping the value of SEL_I_RIPPLE responsive to PFM_ENTRY_COMP being asserted (i.e., responsive to a low load condition being detected).

At time T6, I_CTRL reaches the peak threshold, resulting in PEAK_COMP being triggered and PFM_MODE being asserted. After time T6, the controller operates in PFM mode, where the offset between the valley threshold and the peak threshold is adjusted. In the PFM mode, CLK_SW may be turned off and I_CTRL reaching the peak threshold (i.e., PEAK_COMP being triggered) is used to control the PFM pulse peak current level. In some examples, the peak threshold during the PFM mode may be based on the previous peak threshold value (e.g., at time T5) in the PWM mode plus an offset. The offset is optional. For the PFM mode, the valley threshold may set to zero and the peak threshold may be set at time T5 or at time T5 plus an offset.

Figure 8:
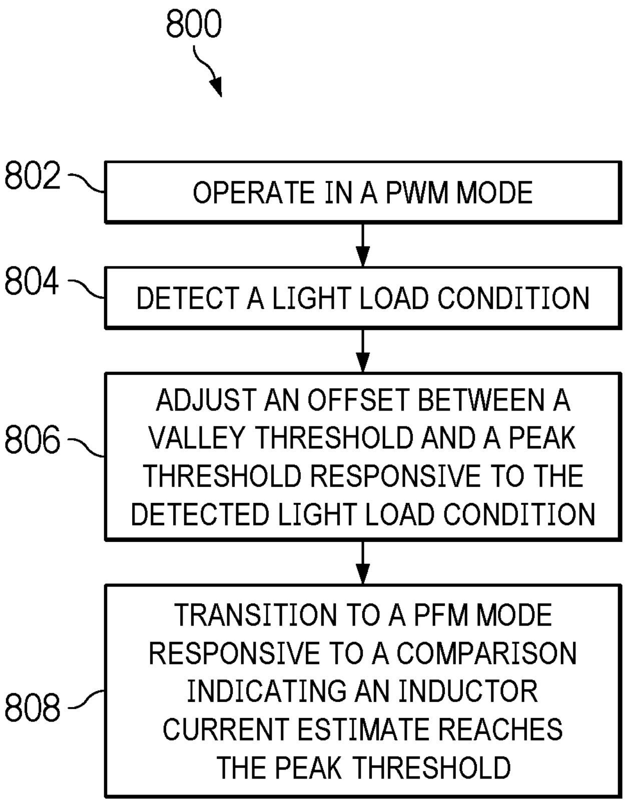
FIG. 8 is a flowchart showing an example switching converter controller method.

FIG. 8 is a flowchart showing an example switching converter controller method 800. The method 800 may be performed, for example, by the controller 148 in FIG. 1, or the controller 148A in FIG. 3. As shown, the method 800 includes operating in a PWM mode at block 802. At block 804, a light load condition is detected. At block 806, an offset between a valley threshold and a peak threshold is adjusted responsive to the detected light load condition. At block 808, transition to a PFM mode is performed responsive to a comparison indicating an inductor current reaches the peak threshold.

In some examples, the method 800 may include: receiving a $V_{SW}$ from the power stage; receiving an VIN from a power supply; and estimating the inductor current of the power stage responsive to the VIN, $V_{SW}$, and ground. Specifically, the HS current is monitored using VIN and $V_{SW}$, while the LS current is monitored using $V_{SW}$ and ground. In some examples, the method 800 may include: providing a first comparison result responsive to the sensed inductor current and the valley threshold; using the first comparison result to control PWM mode switching; providing a second comparison responsive to the sensed inductor current and the peak threshold; and using the second comparison result to control PFM mode switching. In some examples, the method 800 may include: generating a ripple control signal responsive to the second comparison result and the light load condition signal; and periodically reduce the ripple control until the second comparison result indicates the sensed inductor current reaches the peak threshold.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component and/or a conductor.

A circuit or device described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field-effect transistor ("FET") such as an NFET or a PFET, a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control terminal and its first and second terminals. In the context of a FET, the control terminal is the gate, and the first and second terminals are the drain and source. In the context of a BJT, the control terminal is the base, and the first and second terminals are the collector and emitter.

References herein to a FET being "ON" means that the conduction channel of the FET is present and drain current may flow through the FET. References herein to a FET being "OFF" means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other examples, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described examples, and other examples are possible, within the scope of the claims.

What is claimed is:

1. A circuit comprising:

a controller including:

a first control circuit having a first input, a second input, and an output;

a second control circuit having a first input, a second input, and an output;

a detection circuit having a first input, a second input, and an output;

mode control logic having a first input, a second input, a third input, a first output, and a second output, the first input of the mode control logic coupled to the output of the first control circuit, the second input of the mode control logic coupled to the output of the second control circuit, the third input of the mode control logic coupled to the output of the detection circuit; and driver circuitry having a first input, a second input, a first output, and a second output, the first input of the driver circuitry coupled to the first output of the mode control logic, and the second input of the driver circuitry coupled to the second output of the mode control logic;

wherein the mode control logic is configurable to transition from a first mode to a second mode responsive to a state change of the output of the detection circuit; and wherein the controller is configurable to:

reduce an offset between a valley threshold and a peak threshold in steps responsive to the state change, in which the valley threshold is set at a first value and the peak threshold is reduced to a third value prior to transitioning from the first mode to the second mode;

increase the valley threshold to a second value and the peak threshold to a fourth value in the second mode.

2. The circuit of claim 1, wherein the controller has a first input, a second input, a first output, and a second output, and the controller is configured to:

receive an input voltage to a power stage at its first input;

receive a switch node voltage of the power stage at its second input;

sense an inductor current of the power stage responsive to the input voltage, the switch node voltage and ground;

wherein the state change of the output of the detection circuit indicates a light load condition or a change in a load condition; and wherein the mode control logic is configurable to transition from the first mode to the second mode responsive to the light load condition and a comparison indicating the sensed inductor current reaches the peak threshold.

3. The circuit of claim 1, wherein the first control circuit is configurable to:

receive an inductor current sense signal at its first input;

receive a valley threshold at its second input; and provide a first comparison result at its output responsive to the inductor current sense signal and the valley threshold, wherein the second control circuit is configurable to:

receive an inductor current sense signal at its first input;

receive a peak threshold at its second input; and provide a second comparison result at its output responsive to the inductor current sense signal and the peak threshold, and wherein the detection circuit is configurable to:

receive a feedback result at its first input;

receive a light load threshold at its second input; and provide a light load condition signal at its output responsive to the feedback result and the light load threshold.

4. The circuit of claim 3, wherein the mode control logic is configurable to:

receive the first comparison result at its first input;

receive the second comparison result at its second input;

receive the light load condition signal at its third input;

provide a first control signal at its first output responsive to the first comparison result, the second comparison result, and the light load condition signal; and provide a second control signal at its second output responsive to the first comparison result, the second comparison result, and the light load condition signal.

5. The circuit of claim 4, wherein the mode control logic has a third output, and the mode control logic is configurable to provide a ripple control signal at its third output responsive to the second comparison result and the light load condition signal.

6. The circuit of claim 5, wherein the mode control logic is configurable to periodically reduce the ripple control signal at its third output until the second comparison result indicates the sensed inductor current reaches the peak threshold.

7. The circuit of claim 5, wherein the mode control logic includes state machine logic having a first input, a second input, a first output, and a second output, the state machine logic configurable to:

receive the second comparison result at its first input;

receive the light load condition signal at its second input;

assert a pulse-frequency modulation (PFM) peak detection signal responsive to the light load condition signal; and assert a PFM mode signal responsive to the PFM peak detection signal being asserted and the second comparison result indicating the sensed inductor current reaches the peak threshold.

8. The circuit of claim 7, wherein the mode control logic includes ripple control logic having a first input, a second input, and an output, the first input of the ripple control logic coupled to the second output of the state machine logic, the second input of the ripple control logic coupled to the first output of the state machine logic, the output of the ripple control logic coupled to the third output of the mode control logic, and the ripple control logic configurable to:

receive the PFM peak detection signal at its first input;

receive the PFM mode signal at its second input; and provide the ripple control signal at its output responsive to the PFM peak detection signal, the PFM mode signal, and time thresholds.

9. The circuit of claim 8, wherein the controller includes:

voltage-to-current (V2I) circuitry, the V2I circuitry configurable to generate a control current responsive to feedback error and a ripple current responsive to the ripple control signal;

low-side sense circuitry configured to provide the valley threshold responsive to the control current; and high-side sense circuitry configured to provide the peak threshold responsive to the control current and the ripple current.

10. The circuit of claim 1, wherein the first mode is a pulse width modulation (PWM) mode, and the second mode is a pulse frequency modulation (PFM) mode.

11. The circuit of claim 1, wherein the mode control logic is configurable to cause the driver circuitry to provide control signals having a constant frequency in the first mode and to provide control signals having a variable frequency in the second mode.

12. The circuit of claim 1, wherein the controller is configurable to reduce the peak threshold responsive to non-detection of an inductor current reaching the peak threshold.

13. The circuit of claim 1, further comprising an error amplifier having inputs coupled to a power converter output and a reference input, wherein a first input of the detection circuit is coupled to an output of the error amplifier.

14. The circuit of claim 1, further comprising a power stage having a power input, a power output, and control inputs, the control inputs coupled to the first and second outputs of the driver circuitry.

* * * * *